Patented Sept. 28, 1926.

1,601,231

UNITED STATES PATENT OFFICE.

HENRY BLUMENBERG, JR., OF MOAPA, NEVADA, ASSIGNOR TO STOCKHOLDERS SYNDICATE, OF LOS ANGELES, CALIFORNIA, A CORPORATION OF CALIFORNIA.

FLUX FOR ENAMEL, GLASS, AND CERAMIC MATERIALS.

No Drawing.   Application filed October 13, 1924.   Serial No. 743,472.

My invention relates to a flux for enamel composition for metal surfaces and glass and ceramic compositions, and has for its object to produce such compositions which after fusion have a greater brilliancy and elasticity than enamels, glass and ceramic compositions made with sodium borate compounds.

My invention consists of the composition hereinafter described and claimed:

It is a well known fact that boron trioxide possesses weak basic properties and combines with the stronger acids to form salts. For instance, if phosphoric acid is mixed with boric acid a white amorphous mass of boron phosphate is formed, in accordance with the following equation:

$$2B(OH)_3 + 2H_3PO_4 = B_2O_3 \cdot P_2O_5 + 6H_2O$$

I use this boron phosphate as an ingredient in fluxes for enamel glass and ceramic compositions to replace the boron trioxide. As an illustration an enamel mixture is given:

|  | Per cent. |
|---|---|
| Feldspar | 45 |
| Tin oxide | 7 |
| Sodium carbonate | 5 |
| Sodium nitrate | 3 |
| Lead phosphate | 10 |
| Boron phosphate | 30 |

The proportion of the boron phosphate in the above example is given as 30%. It will be understood, however, that the same may be varied within wide limits, depending upon the nature of the composition, whether it is an enamel, glass or ceramic material.

Fluxes containing boron phosphate may be fused at temperatures several hundred degrees C. lower than required for fluxes ordinarily employed. Also my improved flux will combine readily with the bases containing the flux and thereby effecting a uniform enamel and the like composition.

I claim:

1. A flux for enamel, glass or ceramic compositions containing boron phosphate.

2. A flux for enamel, glass or ceramic compositions containing substantially 30% of boron phosphate.

In testimony whereof I have signed my name to this specification.

HENRY BLUMENBERG, JR.